US005228658A

United States Patent [19]

Kelley

[11] Patent Number: 5,228,658

[45] Date of Patent: Jul. 20, 1993

[54] EQUIPMENT SECURITY APPARATUS

[75] Inventor: Donald W. Kelley, Fremont, Calif.

[73] Assignee: Qualtec Data Products, Inc., Fremont, Calif.

[21] Appl. No.: 844,795

[22] Filed: Mar. 2, 1992

[51] Int. Cl.$^5$ ............ F16M 13/00

[52] U.S. Cl. ............ 248/551; 70/58

[58] Field of Search ............ 248/551, 552, 553; 109/52; 70/58, 62, 63, 71; 211/4

[56] References Cited

U.S. PATENT DOCUMENTS

| | | | |
|---|---|---|---|
| 4,248,067 | 2/1981 | Sears | 70/58 |
| 4,325,531 | 4/1982 | Omholt | 70/63 X |
| 4,556,188 | 12/1985 | Allison | 248/552 X |
| 4,712,763 | 12/1987 | Leite . | |
| 4,893,777 | 1/1990 | Gassaway . | |
| 4,973,023 | 11/1990 | O'Neill | 248/553 X |

FOREIGN PATENT DOCUMENTS

| | | | |
|---|---|---|---|
| 2134587 | 8/1984 | United Kingdom | 70/58 |

OTHER PUBLICATIONS

Grolen Inc. "Sure-Sta Security Bars".

*Primary Examiner*—J. Franklin Foss

*Attorney, Agent, or Firm*—Fliesler, Dubb, Meyer & Lovejoy

[57] ABSTRACT

An equipment security apparatus having a first locking member including a disc-shaped member for attaching the first locking member to a surface of an object to be secured and a locking pin extending outwardly therefrom, the locking pin being terminated by an enlarged end portion and a second locking member including a box-shaped housing having a mounting surface for attaching the second locking member to a surface to which the object is to be secured and a key actuated locking bar which is rotatable from an open position to a closed position when the key is rotated for capturing the enlarged end portion of the locking pin when the locking pin is inserted in a hole or slot provided therefor in the second locking member.

8 Claims, 5 Drawing Sheets

EQUIPMENT SECURITY APPARATUS

BACKGROUND OF THE INVENTION

1. Field of the Invention

The present invention relates to equipment security apparatus in general and in particular to apparatus for locking equipment to a horizontal or vertical surface.

2. Description of Prior Art

Office equipment, such as desktop central processing units, file servers, tower-type personal computers, laser printers, facsimile machines, desktop copy machines, entertainment equipment, such as television sets in hotel, motel and hospital rooms, and numerous other types of equipment and apparatus, such as found in laboratories, which are relatively light weight and small in size are susceptible of being stolen when left unattended for even brief periods of time.

Among the various types of lockable security apparatus that have been proposed to prevent thefts of equipment such as described above is apparatus comprising equipment mounted members which have outwardly extending appendages and surface mounted members which comprise means for engaging the appendages and locking the equipment to the surface mounted members. For example, in U.S. Pat. No. 4,893,777 there is provided an apparatus comprising a plate member having a plurality of keyhole-shaped apertures or slots which is attached to a surface as by an adhesive pad. Attached to the bottom of the equipment to be secured there is provided a plurality of cylindrical couplers. The couplers are terminated by an enlarged end portion. In use, the couplers are inserted in the larger portion of the keyhole-shaped apertures. The position of the equipment is then shifted until the enlarged end portion of the couplers is captured beneath the smaller portion of the keyhole-shaped apertures. A locking block which engages an edge of the equipment is then locked to the plate member to prevent a reverse movement of the equipment and removal of the couplers from the keyhole-shaped apertures. Alternatively, a separate base plate member is mounted to the equipment and separate shouldered couplers are used to connect the two plate members together.

In U.S. Pat. No. 4,712,763 there is provided a security device for office machines comprising a plurality of equipment mounted couplers having appendages with enlarged end portions extending outwardly therefrom, an outer box-shaped housing having a plurality of holes provided in the surface thereof for receiving the appendages and an inner box-shaped housing having a plurality of key-shaped slots which are moved into registration with the holes in the outer box-shaped housing to engage the enlarged end portions of the appendages when the inner box-shaped housing is moved relative to the outer box-shaped housing in a telescoping fashion. A key operated lock is provided to lock the inner box-shaped housing in the outer box-shaped housing.

The above-described security apparatus has a number of disadvantages. For example, the size of the plate member(s) and housings normally used is substantially equal to the footprint of the equipment locked thereto requiring the manufacture and stocking of various sizes of plate members and housings to accommodate various sizes of equipment and the placement of the equipment mounted members is dictated by the location of the key-shaped apertures in the plate members and housings. Moreover, the locking block used in the first described apparatus tends to be relatively bulky, is external to the equipment and therefore unsightly while the structures in both the first and second described apparatus appear to require a separate plate member to provide flexibility in the type of equipment that can be protected.

In still another prior known security apparatus there is provided a pair of U-shaped bars with downwardly depending T-shaped legs. The bars are permanently attached to the bottom of the equipment to be secured as by adhesive strips. A corresponding pair of locking boxes is provided for mounting to a surface, as by adhesive strips. Each of the boxes is provided with a T-shaped hole for receiving the T-shaped legs of the U-shaped bars. In use, after the legs are inserted in the holes in the boxes the equipment is shifted so that the enlarged portion of the legs is captured beneath the narrower portion of the T-shaped hole in the boxes. A key operated lock is then actived to move a blocking member against one of the legs to prevent movement of the legs in a reverse direction.

The use of the U-shaped bars and boxes in the apparatus described above also has a number of disadvantages. For example, the bars cannot be removed from the equipment when the equipment is removed from the boxes making it difficult to place the equipment on a surface without damaging the surface, the fixed length of the bars limits their placement on the equipment, requires the manufacture and stocking of different sizes of bars and boxes to accommodate different sizes of equipment, and in general, the bars and boxes are required to be mounted in parallel, limiting the placement of the boxes on a supporting surface and the manner in which the bars can be mounted on the equipment.

SUMMARY OF THE INVENTION

In view of the foregoing, a principal object of the present invention is an improved equipment security apparatus for removably locking equipment to a surface. The equipment may comprise, for example, office equipment such as desktop central processing units, file servers, tower-type personal computers, laser printers, facsimile machines and desktop copy machines. The apparatus also may be used for securing entertainment equipment such as television sets found in hotel, motel and hospital rooms, as well as other types of equipment and apparatus such as found in laboratories which are generally relatively light-weight and susceptible of being stolen if left unattended for even short periods of time.

In the apparatus there is provided a pair of box-shaped members which are attached to a mounting surface as by an adhesive strip or mounting screws and two pair of locking members which are attached to the equipment to be secured as by glue such as Super Bonder made by Loctite, Newington, Conn. Each of the equipment mounted locking members generally comprises a circular disc-shaped member. A locking pin extends outwardly from the central portion thereof and is terminated by an enlarged end portion. In each of the surface mounted box-shaped members there is provided an elongated key-operated L-shaped locking bar. The locking bar is located in the housing beneath a pair of locking pin apertures comprising a locking pin receiving slot and locking pin receiving hole in the top of the box-shaped members.

In use, when the locking pins extending from the equipment mounted locking members are inserted in a respective one of the locking pin holes or slots, the key is rotated, rotating the locking bar from an open position to a closed position wherein it captures the enlarged end portion of the locking pins.

The dimensions of the slot in the top of the box-shaped locking members, the dimensions of the locking pin and the dimensions and placement of the key-actuated locking bar are such as to permit one of the pin members in each pair of equipment mounted locking members to be inserted at any position along the slot. This feature allows for considerable flexibility in selecting the placement of the equipment mounted locking members. Another feature of the present invention is that the locking pin member is attached to the disc member in each of the equipment mounted locking members in such a manner so as to permit the removal of the locking pin member therefrom. By providing for the removal of the locking pin member from the disc member, the disc members may be used in the fashion of a conventional foot member to support the equipment on a table top, desk, counter or the like, when the locking pin member is removed therefrom.

In addition to the above advantages, the apparatus of the present invention provides a low profile which is nearly invisible when used to secure equipment to a surface. It can be used for top or side mounting, requires no special tools for installation and no modification to equipment. It is easy to disconnect, highly resistant to tampering, versatile, easy and quick to install, will not void manufacturer's warranties and allows for equipment repairs to be done quickly.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

Figure 1A:
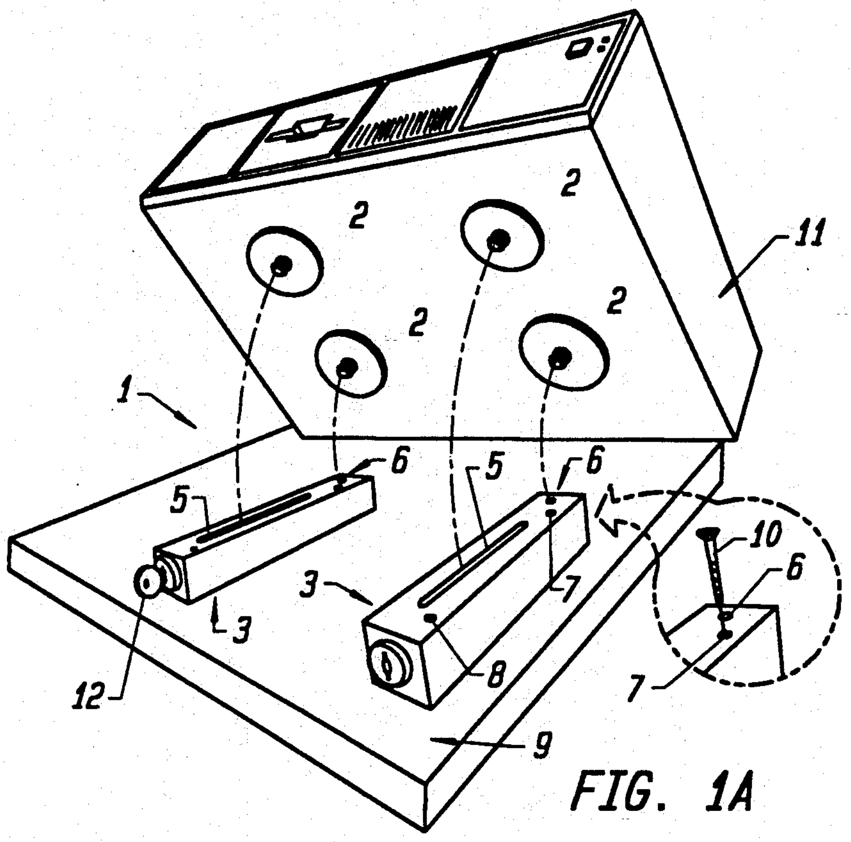
FIG. 1 is an exploded perspective view of equipment security apparatus according to the present invention.
Figure 1B:
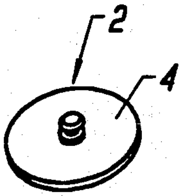
Figure 14:
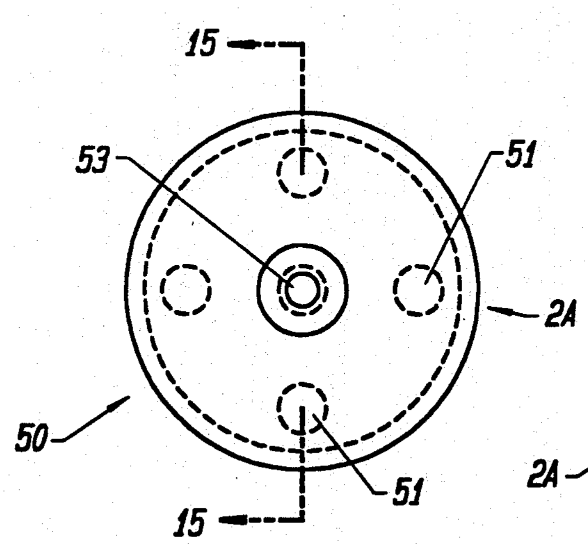
FIG. 14 is a plan view of a disc-shaped member in an equipment mounted locking member according to the present invention.
Figure 15:
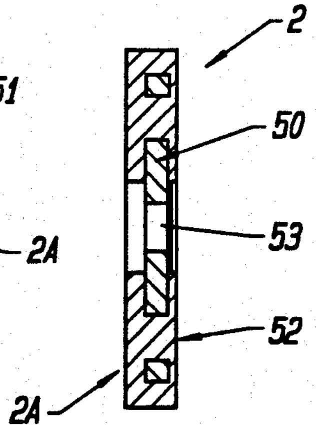
FIG. 15 is a cross-sectional view taken in the direction of lines 15—15 of FIG. 14.

Referring to FIG. 1, there is provided an equipment security apparatus according to the present invention designated generally as 1. In the apparatus 1 there is provided a plurality of equipment mounted first locking members designated generally as 2 and a plurality of surface mounted, elongated, box-shaped second locking members designated generally as 3. As will be further described below, each of the locking members 2 comprises a pad member 2A and an outwardly extending locking pin member 4. In each of the locking members 3 there is provided an elongated locking pin slot 5 and a locking pin hole 6, as well as a pair of counter-sunk screw receiving holes 7 and 8 for mounting the locking members 3 to a horizontal or vertical surface 9 as by mounting screws 10.

Figure 4:
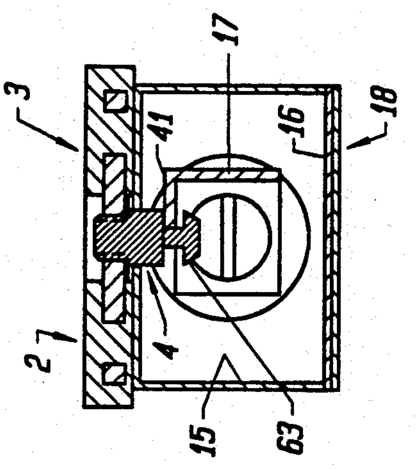
FIG. 4 is an end cross-sectional view taken in the direction of lines 4—4 in FIG. 3.
Figure 5:
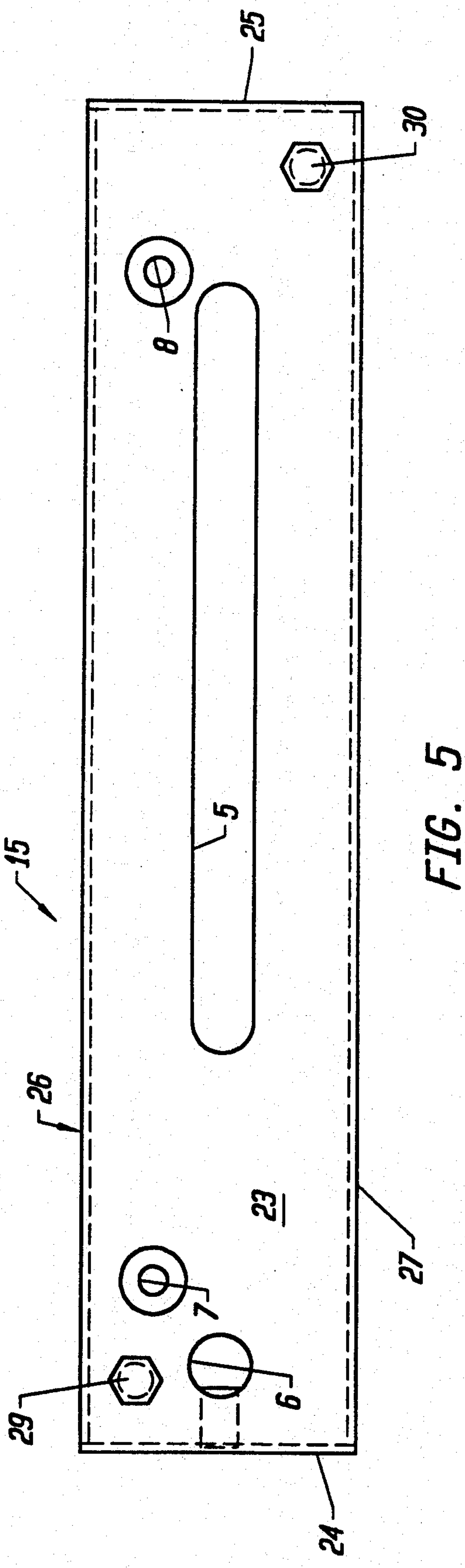
FIG. 5 is a top plan view of the box-shaped member according to the present invention.
Figure 7:
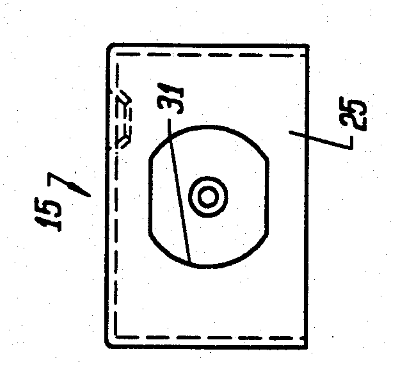
FIG. 7 is an end view of FIG. 6.
Figure 6:
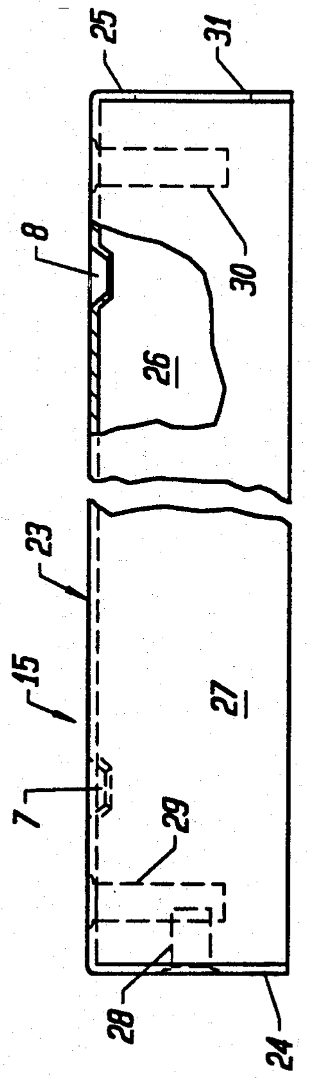
FIG. 6 is a side partial cross-sectional view of FIG. 5.
Figure 8:
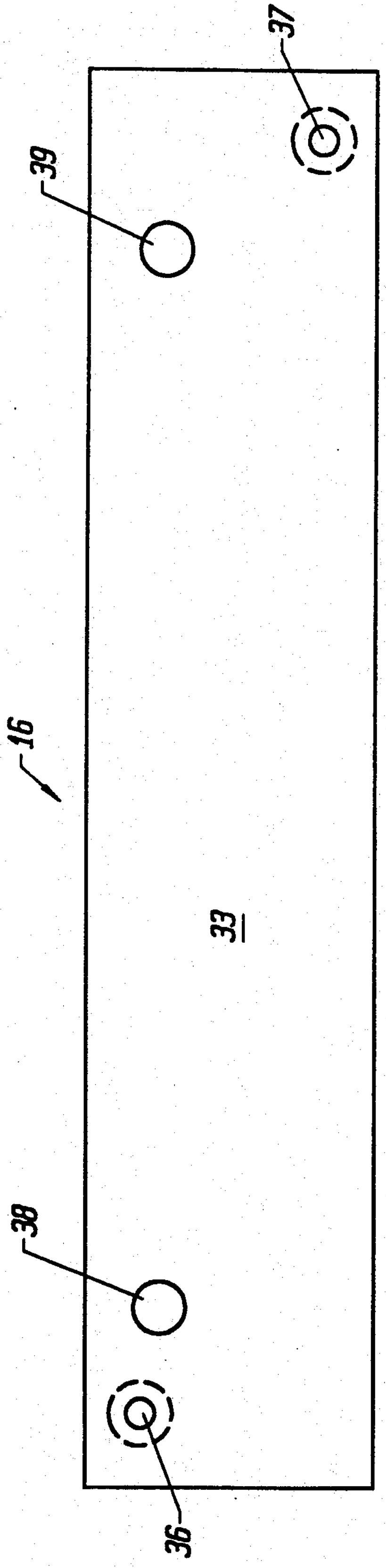
FIG. 8 is a top plan view of a channel member in a security apparatus according to the present invention.
Figure 10:
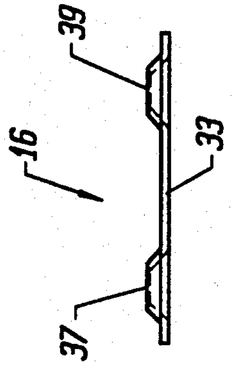
FIG. 10 is an end view of FIG. 9.
Figure 9:
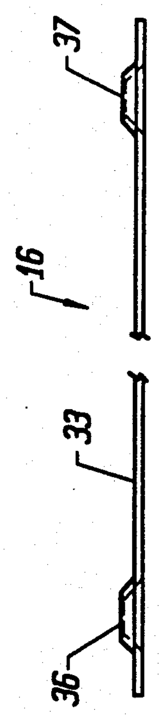
FIG. 9 is a side view of FIG. 8.
Figure 12:
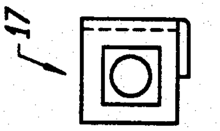
FIG. 12 is an end view of FIG. 11.
Figure 11:
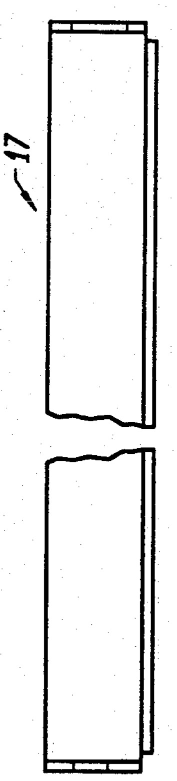
FIG. 11 is a plan view of a key-actuated locking bar according to the present invention.
Figure 13:
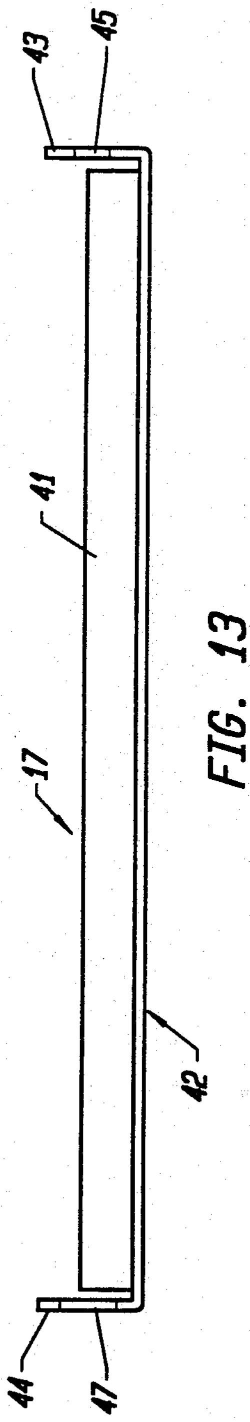
FIG. 13 is a side view of FIG. 11.

Referring to FIGS. 2–13, there is provided in each of the elongated box-shaped locking members 3 a first open walled box-shaped member 15 as will be described in more detail with respect to FIGS. 5–7, a flat plate member 16 as will be described in more detail with respect to FIGS. 8–10, a key actuated L-shaped locking bar 17 as will be described in more detail with respect to FIGS. 11–13, and a cam lock locking mechanism 19.

Figure 2:
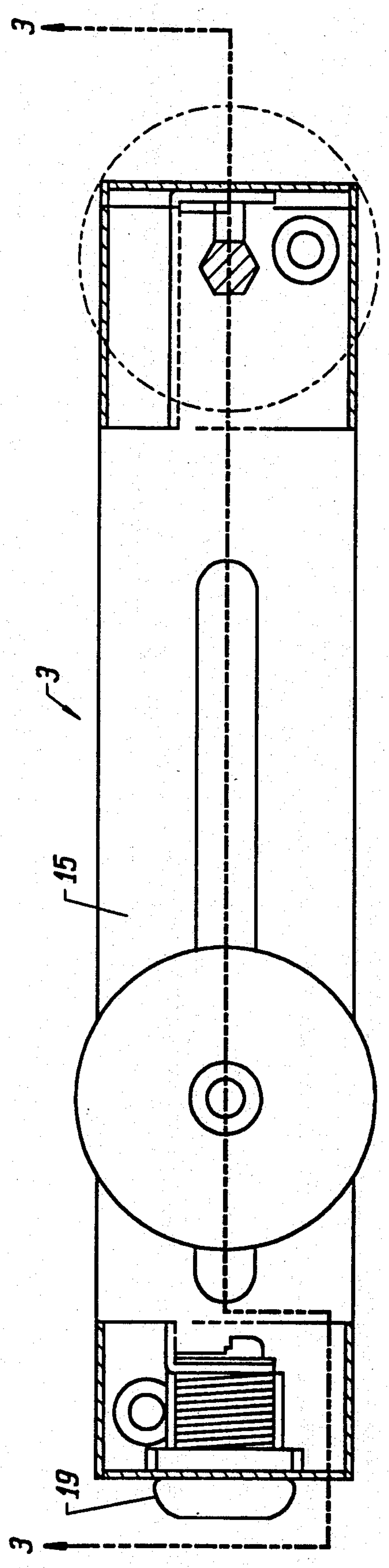
FIG. 2 is a top plan partial cross-sectional view of a box-shaped locking member and disc-shaped equipment mounted member according to the present invention taken in the direction of lines 2—2 in FIG. 3.
Figure 3:
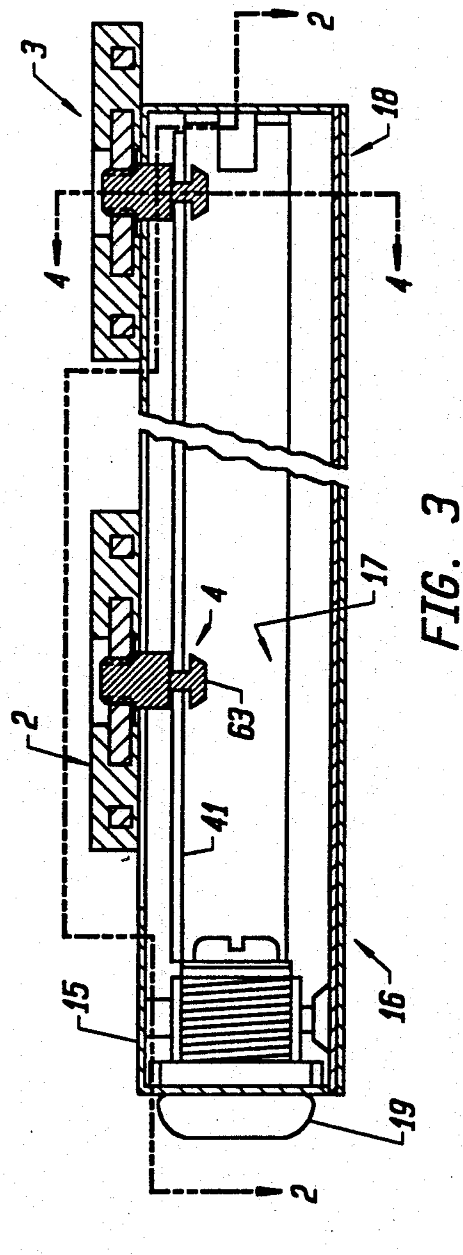
FIG. 3 is a side elevation cross-sectional view taken in the direction of lines 3—3 in FIG. 2.

Referring to FIGS. 5–7, there is provided in the member 15 a top wall 23, a first end wall 24, a second end wall 25 and a pair of side walls 26, 27. The member 15 is open at the bottom. Extending inwardly from the end wall 24 there is provided a locking bar supporting post 28 and from the top wall 23 a pair of downwardly extending screw receiving posts 29, 30 which, as will be described below, are used for attaching the plate member 16 to the member 15. In the wall 25 there is provided a locking mechanism receiving hole 31 for receiving the cam lock locking mechanism 19, as shown in FIGS. 2 and 3. The locking mechanism 19 is retained in the hole 31 in a conventional manner as by a retaining clip. In the top wall 23 there is provided a plurality of apertures comprising the elongated locking pin receiving slot 5 and hole 6 and the counter-sunk mounting holes 7, 8.

The member 15 is typically made from a sheet of 45 mil thick steel. It is approximately 8 inches long, 1.75 inches wide and 1.125 inches high. The centers of the radii of the slot 5 are approximately 4.25 inches apart and the width of the slot 5 is approximately 0.313 inches. The diameter of the hole 6 is approximately 0.312 inches.

Referring to FIGS. 8–10, there is provided in the plate member 16 a pair of counter-sunk holes 36, 37 which are located to be in registration with screw receiving posts 29 and 30, respectively, and a pair of holes 38 and 39 which are in registration with holes 7 and 8, respectively, in member 15. The member 16 is typically made from a sheet of 45 mil thick steel, is approximately 8 inches long and 1.75 inches wide. An adhesive strip 18 having a high holding strength, e.g. 80 psi, such as is made by 3M, Minneapolis, Minn., is provided on the outside surface of the plate 16 to attach the member 3 to a surface after the plate 16 is screwed to the member 15 as shown in FIGS. 3 and 4.

Referring to FIGS. 11-13, there is provided in the key-actuated L-shaped locking bar 17 an elongated rectangular wall 41 and perpendicular thereto an elongated rectangular wall 42. Wall 41 is approximately 7.06 inches long and 0.390 inches wide. Wall 42 is approximately 7.3 inches long and 0.66 inches wide. Located at opposite ends of the walls 41, 42 and perpendicular thereto there is provided a pair of end wall 43, 44. In the end wall 43 there is provided a circular hole 45 for receiving the locking bar supporting post 28 as shown in FIG. 3. In the end wall 44 there is provided a square hole 47 for receiving a correspondingly shouldered end portion of the locking mechanism 19 as shown in FIG. 3. Each side of the hole 47 is approximately 0.35 inches long.

Referring to FIGS. 14-17, the pad member 2A in each of the locking members 2 comprises a steel disc 50 in which there is provided a plurality of holes 51. The disc 50 is encased within a material 52 such as Neoprene. In the center of the disc 50 there is provided a threaded hole 53.

Figure 16:
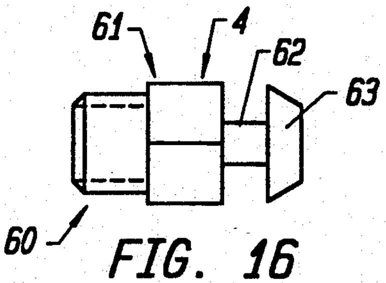
FIG. 16 is a side view of a locking pin according to the present invention.
Figure 17:
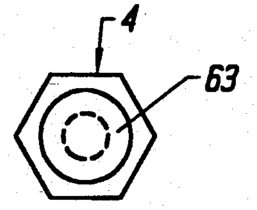
FIG. 17 is an end view of FIG. 16.

Referring to FIGS. 16 and 17, there is provided in the locking pin 4 a threaded portion 60, a hexagonal shouldered portion 61, a narrow portion 62 which is terminated by an enlarged beveled end portion 63. The major diameters of the portion 61 and 63 are approximately 0.28 inches. The diameter of the narrow portion 62 is approximately 0.125 inches. The threaded portion 60 is provided for removably screwing the locking pin 4 into the threaded bore 53 of the disc member 2.

Figure 18:
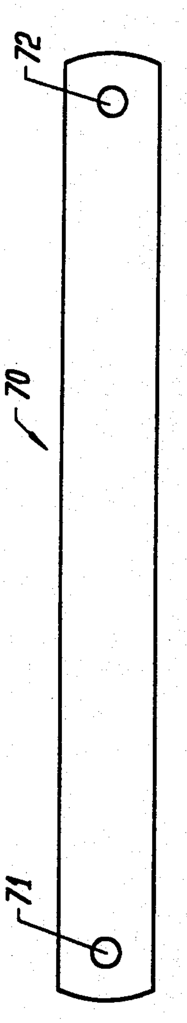
FIG. 18 is a plan view of a key extender according to the present invention.
Figure 19:
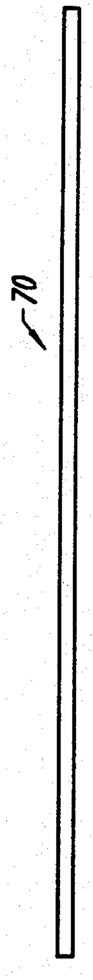
FIG. 19 is a side view of FIG. 18.

Referring to FIGS. 18 and 19, there is provided as an accessory to the equipment security apparatus 1 a key extender bar designated generally as 70. Bar 70 is approximately 6 inches long and 0.06 inches wide and is provided with a pair of holes 71, 72 at either end for fastening a key to the extender 70. The extender 70 with a key attached thereto facilitates the opening and closing of the equipment security apparatus when the locking mechanisms 19 are recessed or lie beneath the equipment secured thereby.

Referring again to FIG. 1, to use the equipment security apparatus 1 of the present invention, the disc members 2 are attached to the equipment to be secured as by a glue such as Super Bond made by Loctite, Newington, Conn. having a high holding strength. A pair of discs 2 is associated with each one of the locking members 3 and may be mounted to the equipment 11 at various distances apart to accommodate available mounting surfaces on the equipment 11. A principal feature of the present invention is a slot 5 which permits the discs 2 in each pair to be mounted over a wide range of distances apart, for example, from a minimum of 2 inches to a maximum of 6.25 inches. Moreover, it will be appreciated that the flexibility of mounting the discs 2 to the equipment 11 which is provided by the slot 5 in each of the members 3 also permits the members 3 and their corresponding disc members 2 to be mounted in non-parallel orientations.

The members 3 may be mounted to the surface 9 by means of the screw 10, as described above, or alternatively by means of an adhesive strip having a high holding strength, e.g. 80 psi, such as made by 3M, Minneapolis, Minn.

With the locking bar in its open position, the locking pin members 4 of two of the discs 2 are inserted in the holes 6 at the rear of the members 3 and the locking pin members 4 of the remaining discs 2 are inserted in the slots 5. Thereafter, a key 12 is inserted in the locking mechanism 19 and rotated causing the locking bar 17 to be rotated from its open position to its closed position wherein the wall 41 captures the enlarged end 63 of the locking pin 4 as shown in FIGS. 3 and 4. To unlock the apparatus, the rotation of the key 12 is reversed.

Another important feature of the present invention is that if it becomes necessary to remove the equipment 11 from the locking members 3, it is possible to unscrew the locking pins 4 from each of the disc members 2 so that the disc members 2 may be used in the fashion of a conventional foot member to support the equipment 2 on a table top, desk, or the like, without damaging the surface thereof.

While preferred embodiments of the present invention are described above, it is contemplated that numerous modifications may be made thereto for particular applications without departing from the spirit and scope of the present invention. For example, the hole 6, shown as a round hole, may be any suitable shape, including a slot-like shape, so long as it is compatible with the locking features of the present invention. Similarly, the disc 50 need not be round but may be any suitable shape. Accordingly, it is intended that the embodiments described be considered only as illustrative of the present invention and that the scope thereof should not be limited thereto but be determined by reference to the claims hereinafter provided.

I claim:

1. An equipment security apparatus comprising:

a first locking member, said first locking member including means for attaching said first locking member to a surface of an object to be secured and a locking pin means comprising a locking pin extending outwardly therefrom, said locking pin being terminated by an enlarged end portion; and a second locking member, said second locking member including means for attaching said second locking member to a surface to which said object is to be secured and a key actuated locking bar which is rotatable from an open position to a closed position when the key is rotated for capturing the enlarged end portion of the locking pin when the locking pin is inserted in an aperture provided therefor in said second locking member, and wherein said means for attaching the first locking member to a surface of an object to be secured and said locking pin means comprise a pad member and means for removably connecting the locking pin to the pad member so that said pad member can be used in the fashion of a conventional foot member to support the object on a table top, desk or the like when the locking pin is removed therefrom.

2. An equipment security apparatus according to claim 1 wherein said connecting means comprise a threaded hole in the first attaching means and threads on the end of the locking pin opposite the enlarged end portion thereof.

3. An equipment security apparatus according to claim 2 wherein said pad member comprises a disc-shaped member.

4. An equipment security apparatus comprising:

a first locking member, said first locking member including means for attaching said first locking member to a surface of an object to be secured and a locking pin means having a locking pin extending outwardly therefrom, said locking pin being terminated by an enlarged end portion; and a second locking member, said second locking member including a housing having a locking pin receiving hole and an elongated locking pin receiving slot, means for attaching said housing to a surface to which said object is to be secured, said housing including a key actuated locking bar and means for rotatably mounting the key actuated locking bar in the housing beneath said pin receiving hole and slot, said key actuated locking bar being rotatable from an open position to a closed position when the key is rotated for capturing the enlarged end portion of the locking pin when the locking pin is inserted in one of said locking pin receiving hole and elongated locking pin receiving slot.

5. An equipment security apparatus according to claim 4 wherein said key actuated locking bar and said pin receiving slot have dimensions and are positioned such that the locking pin can be inserted in the slot at any position therein and the enlarged end thereof captured by the locking bar when the locking bar is rotated to its closed position.

6. An equipment security apparatus according to claim 4 wherein said key actuated locking bar comprises an elongated L-shaped metal member having a wall with a first hole at one end for receiving a supporting pin and a wall with a second hole on the opposite end for attaching said locking bar to a rotatable locking mechanism.

7. An equipment security apparatus according to claim 4 wherein said housing comprises:

a first part including an elongated rectangularly-shaped top wall in which is located the locking pin receiving hole and slot, a first and a second end wall and a first and second side wall and said means for mounting the key actuated locking bar in the housing beneath said pin receiving hole and slot comprises means which extends inwardly from said first end wall for engaging a first hole provide therefor in a wall of said locking bar and a locking mechanism which extends inwardly from said second end wall including means for engaging a second hole provided therefor in a second wall of said locking bar such that said locking mechanism and said second hole cooperate so as to prevent relative rotation of the locking bar and locking mechanism;

a second part including a plate member for enclosing the bottom of the first part;

means for connecting the first and second parts; and means for attaching the first and second parts to a surface.

8. An equipment security apparatus according to claim 7 wherein said means for attaching the first and second parts to a surface comprises adhesive or screw means.

* * * * *